United States Patent
Kowaguchi (10) Patent No.: US 6,624,809 B1
(45) Date of Patent: Sep. 23, 2003

(54) DISPLAYED INFORMATION MANAGEMENT METHOD

(75) Inventor: Satoshi Kowaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/457,804

(22) Filed: Dec. 9, 1999

(30) Foreign Application Priority Data

Dec. 10, 1998 (JP) ............................................. 10/351897

(51) Int. Cl.<sup>7</sup> ............................................. G09G 5/00
(52) U.S. Cl. ................... 345/169; 379/93.23; 455/461; 455/158.4; 455/166.1
(58) Field of Search ................................ 345/169, 901; 379/93.23, 354; 455/461, 464, 158.4, 158.5, 166.1, 166.2

(56) References Cited

U.S. PATENT DOCUMENTS

| | | | | |
|---|---|---|---|---|
| 5,541,988 A | * | 7/1996 | Draganoff | 379/354 |
| 5,768,362 A | * | 6/1998 | Moon | 379/356 |
| 5,982,876 A | | 11/1999 | Albesa | 379/354 |
| 5,987,336 A | * | 11/1999 | Sudo et al. | 455/566 |
| 6,006,087 A | * | 12/1999 | Amin | 455/413 |
| 6,075,992 A | * | 6/2000 | Moon et al. | 455/455 |

FOREIGN PATENT DOCUMENTS

| | | |
|---|---|---|
| GB | 0/401849 A2 | 12/1990 |
| JP | 63-14549 | 1/1988 |
| JP | 64-51741 | 2/1989 |
| JP | 1-92800 | 4/1989 |
| JP | 9/186760 | 7/1997 |
| JP | 10-124530 | 5/1998 |
| JP | 10-136075 | 5/1998 |

* cited by examiner

*Primary Examiner*—Bipin Shalwala
*Assistant Examiner*—Jimmy H. Nguyen
(74) *Attorney, Agent, or Firm*—Scully, Scott, Murphy & Presser (57) ABSTRACT

A displayed information management method allowing easy operation of a portable communication apparatus is disclosed. After selecting data from a set of data according to a desired condition inputted through a ten-key pad, a sequential index number is added to each piece of selected data. The sequential index number is not greater than a maximum number of lines displayable on the display. Each piece of the selected data accompanied with a sequential index number is displayed on the display. A desired piece of selected data is selected by a user inputting a sequential index number accompanying the desired piece of selected data through the ten-key pad.

1 Claim, 9 Drawing Sheets

HIT LIST PAGE DISPLAY

FIG. 5B

INDEX NUMBER SELECTION

FIG. 5C

DISPLAY DETAILED INFORMATION

DISPLAYED INFORMATION MANAGEMENT METHOD

BACKGROUND OF THE INVENTION

1. Field of the Invention

The present invention generally relates to a portable communication device such as a mobile telephone, and in particular to a method for managing displayed information to allow easy operation.

2. Description of the Related Art

A mobile telephone such as a cellular phone or a PHS (Personal Handy-phone System) terminal has been widely used. The mobile telephone preferably reduces in size and weight with an eye to its portability and is preferably multifunctional and intelligent. In general, a multifunctional and intelligent mobile telephone burdens its user with complicated operations, resulting in impaired operability. In the case of a mobile telephone having a phonebook function, for example, the larger the number of registered records, the more the time required for searching.

There have been proposed several techniques to improve the operability of a mobile telephone. Japanese Patent Unexamined Publication No. 10-124530 discloses a method for searching a large amount of data for target data. More specifically, when a user selects the nearest one to the target data from headings displayed on screen, the data number of the selected heading is set to an index I existing in a processor. Then, each time a next screen is desired, a predetermined number of headings with the center of the index I are displayed on screen together with the respective index numbers.

Japanese Patent Unexamined Publication No. 10-136075 discloses a method for accessing a target entry of a set of data. More specifically, when a character is selected, the set of data is searched for an entry including the selected character. If such an entry is found, the entry is displayed on screen and, if necessary, the entry is allowed to be corrected by the user. Then, the set of data is repeatedly searched for the found entry or the corrected entry as described above until the target entry has been found.

SUMMARY OF THE INVENTION

An object of the present invention is to provide a displayed information management method that can achieve easy operation of a multifunctional and intelligent device According to the present invention, a method for managing information in a portable communication apparatus including a memory, an input device, and a display, the method comprising the steps of:

a) selecting data from a set of data according to a desired condition inputted through the input device:

b) adding a sequential index number to each piece of selected data, wherein the sequential index number is not greater than a maximum number of lines displayable on the display:

c) displaying each piece of the selected data accompanied with a sequential index number on the display; and d) selecting a desired piece of selected data by inputting a sequential index number accompanying the desired piece of selected data through the input device.

The input device preferably includes a ten-key pad which is used to input a sequential index number to select a desired piece of selected data. The sequential index number may be a number corresponding to a key of the ten-key pad.

The set of data may be a phonebook which retrievably contains a plurality of phone data records, each of the phone data records including a plurality of data items.

The selected data may be a set of phone data records retrieved from the phonebook according to a desired keyword, wherein data items of the selected phone data records corresponding to the desired keyword are displayed as headings. A desired one of the data items of the selected phone data records is selected by inputting a sequential index number accompanying the desired one through the input device, so that all data items of a phone data record including the desired one are displayed on the display.

The set of data may be function menu information which retrievably contains a plurality of functions. The selected data is a set of functions retrieved from the function menu information according to a desired keyword. A desired function of the selected functions is selected by inputting a sequential index number accompanying the desired one through the input device, so that the desired function is executed.

According to anoterh aspect of the present invention, a method for managing information in a portable communication apparatus including a memory, an input device, and a display, the method comprising the steps of:

selecting data from a set of data according to a desired condition inputted through the input device;

determining whether a number of pieces of selected data is not greater than a maximum number of lines displayable on the display;

when the number of pieces of selected data is greater than the maximum number of lines displayable on the display, dividing the selected data Into a plurality of pages each containing a number of pieces of selected data which is not greater than the maximum number of lines displayable on the display;

sequentially selecting a page from the plurality of pages through the input device;

adding a sequential index number to each piece of selected data in a selected page;

displaying each piece of the selected data accompanied with a sequential index number in the selected page on the display; and selecting a desired piece of selected data by inputting a sequential index number accompanying the desired piece of selected data through the input device.

As described above, according to the present invention, the selected data is indexed and displayed on the display. Therefore, a user can easily obtain a desired piece of data by directly selecting an index number corresponding to the desired piece of displayed data through the input device. Even if the portable communication apparatus becomes more intelligent and multifunctional, the user can easily operate such a portable communication apparatus, so that mistakes are avoided and the time required for necessary operation is reduced.

DETAILED DESCRIPTION OF THE PREFERRED EMBODIMENTS

Figure 1:
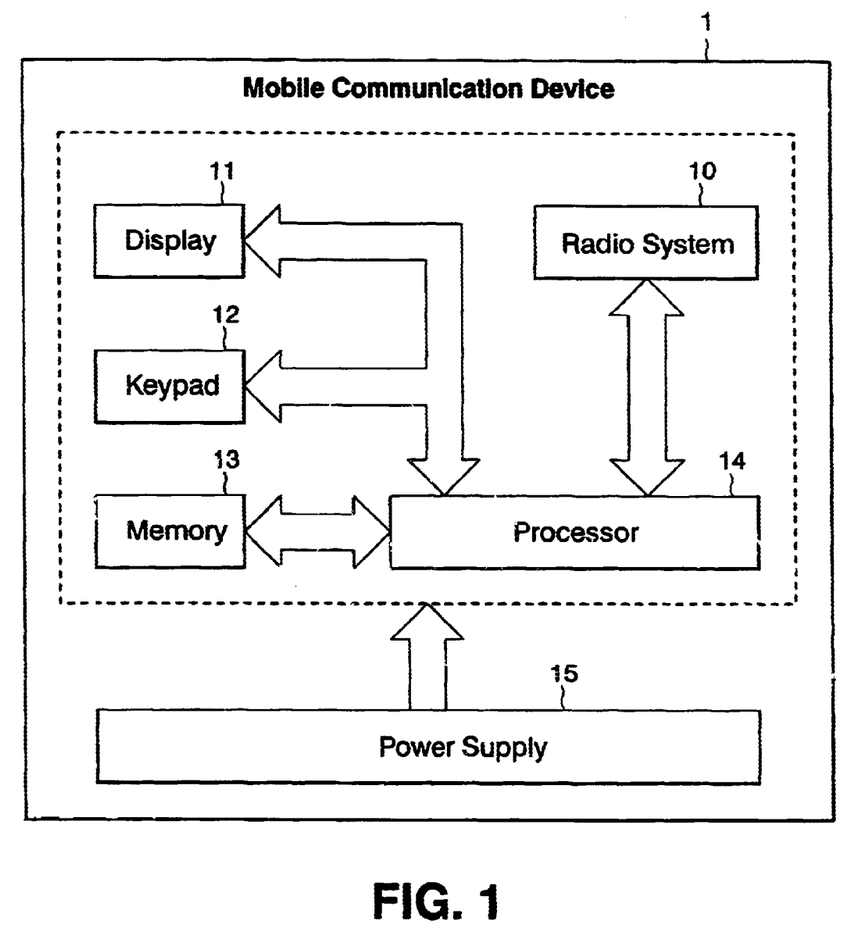
FIG. 1 is a block diagram showing a radio mobile telephone implementing an information management method according to the present invention.

Referring to FIG. 1, there is shown a mobile telephone having a phonebook function in accordance with the present invention. The mobile telephone is provided with a radio system 10 that transmits and receives a radio signal to and from a radio base station (not shown). The mobile telephone is further provided with a display 11, a keypad 12, a memory 13, a processor 14, and a power supply 15.

The keypad 12 includes a ten-key pad consisting of numerals "0"–"9", "*" and "#". The keypad 12 is used to input a phone number and various commands. Here, the display 11 may be a liquld-crystal display (LCD) with a relatively large area screen to display necessary information. The memory 13 stores phonebook data and control programs including an information management program which is used to perform the index management.

The processor 14 is a program-controlled processor such as a central processing unit (CPU). A control program for the mobile telephone is stored in the memory 13 and runs on the processor 14 to control the operations of the mobile telephone including transmission and reception operations, phonebook searching operation, and an index management operation as described later.

Figure 2:
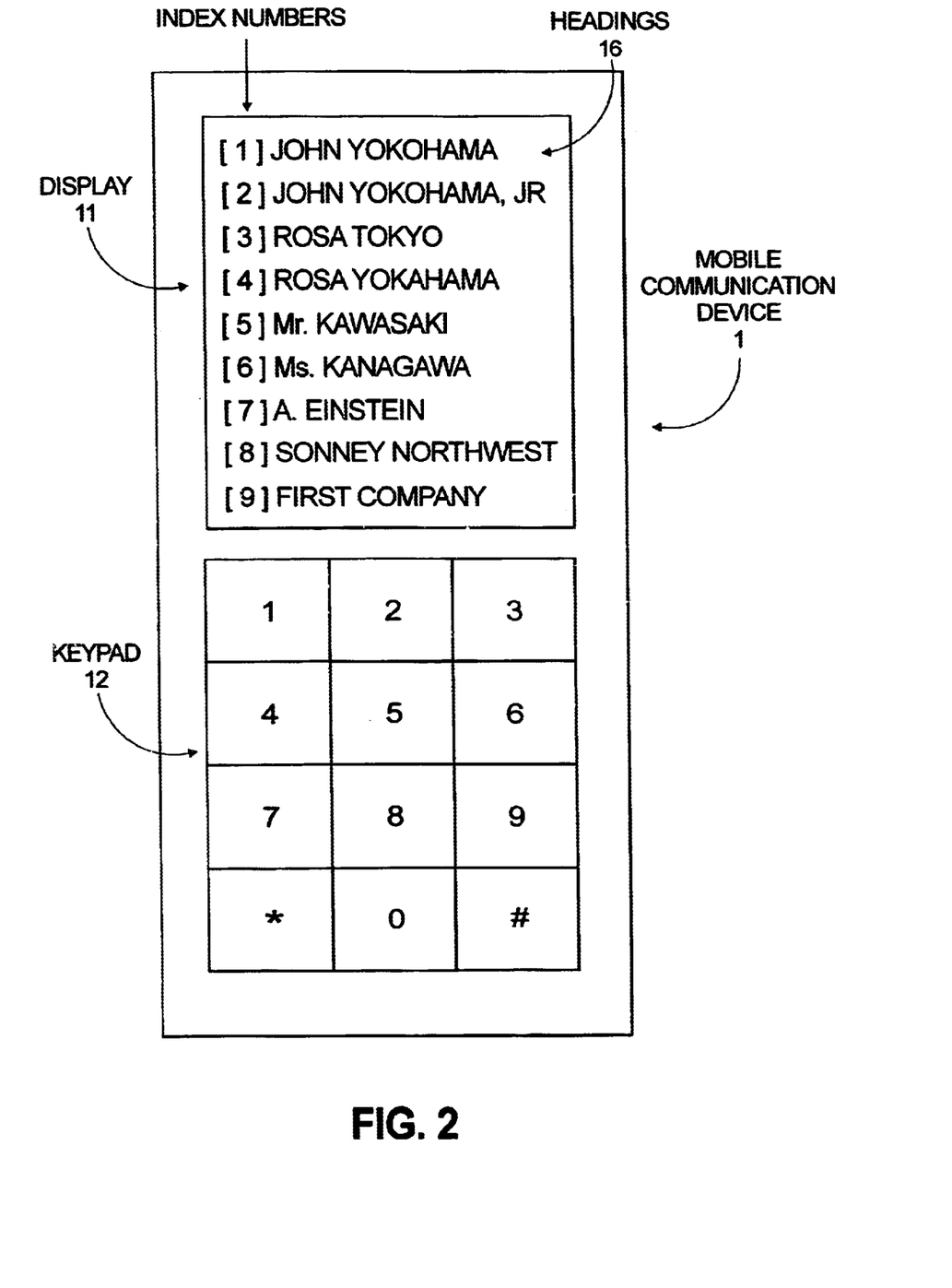
FIG. 2 is a plan view showing the radio mobile telephone having a display and a keypad.

Referring to FIG. 2, the radio mobile telephone according to the present invention is provided with a relatively large area display 11. In this embodiment, the maximum number of data lines displayed on the display 11, Dmax, is set to 9. As shown in FIG. 2, the respective pieces of name data, or headings 16, accompanied by index numbers [1] through [9] are displayed on the display 11. The keypad 12 is provided immediately below the display 11 so that the user can operate the ten-key pad while looking at the display 11.

Figure 3:
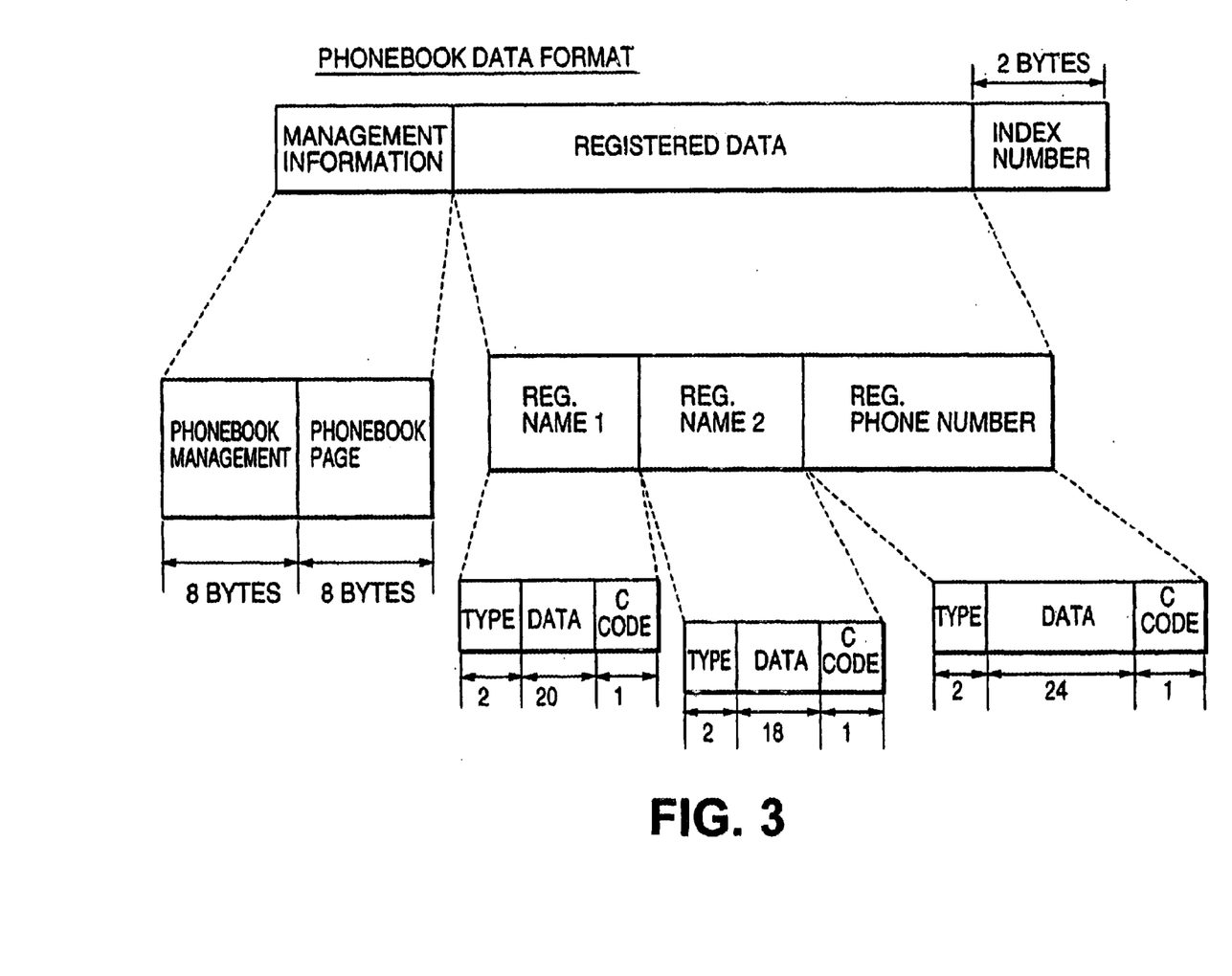
FIG. 3 is a diagram showing a phonebook data format of a record.

As shown in FIG. 3, a record of phonebook data has a format consisting of a management information field, a registered data field, and an index number field. The management information field is composed of an 8-byte phonebook management field and an 8-byte phonebook page field. The registered data field is composed of a first name field, a second name field, and a phone number field. The first name field is further composed of a 2-byte type field, a 20-byte data field, and a 1-byte control code field. The second name field is further composed of a 2-byte type field, an 18-byte data field, and a 1-byte control code field. The phone number field is further composed of a 2-byte type field, a 24-byte data field, and a 1-byte control code field. The index number field is of 2 bytes, which is used to search the phonebook.

The first and second name fields may be used in a different way. For example, the first name field is used to store Japanese-word (kanji) characters of a personal name and the second name field is used to store its phonetic (kana) characters.

The phonebook data as described above are retrievably stored in the memory 13 and the retrieved pieces of phonebook data are displayed on the display 11 as described hereafter.

INDEX MANAGEMENT

Figure 4:
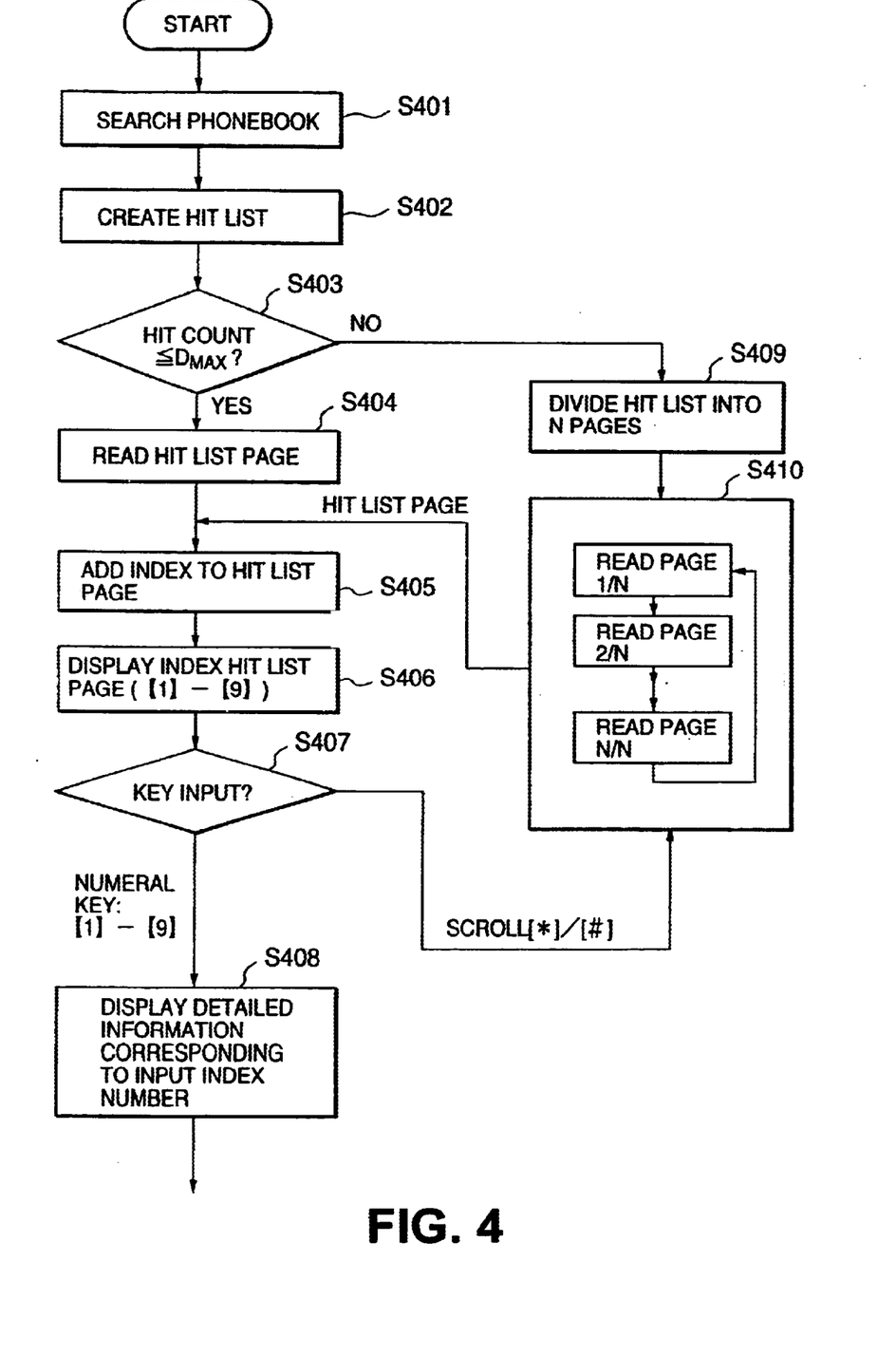
FIG. 4 is a flowchart showing an index management operation according to an embodiment of the present invention.

Referring to FIG. 4, when the user instructs the phonebook searching with a key word through the keypad 12, the processor 14 starts the search program running thereon (step S401). One or more of the first name, the second name, and the phone number can be used as a search condition. If at least one hit is found in the phonebook, hit data is read out from the phonebook to create a hit list (step S402).

Thereafter, the processor 14 starts a display information management program to display the hit list so as to allow easy operation. First, it is determined whether the number of hits is not greater than the maximum count Dmax (step S403). In the case where the number of hits is not greater than the maximum count Dmax (YES in step S403), the hit list is read out as one page (step S404) and then index numbers [1]–[9] for easy operation are added to the records included in the hit list page, respectively (step S405). The indexed hit list page is displayed on the display 11 (step S406).

Then, it is determined whether a key of the ten-key pad is pushed (step S407). If one of the numeral keys [1]–[9] of the ten-key pad is selected as a direct key, the processor 14 reads the detailed data of the record corresponding to the selected index number and displays the detailed data on the display 11 (step S408). In this manner, If the user wants more detailed information of a displayed item to be displayed, the user selects the corresponding one of the index numbers by pushing the ten-key of the index number corresponding to the desired item. If a symbol key "*" or "#" of the ten-key pad is selected in the step S407, the processor 14 calls a page scroll routine (step S410) as described later.

On the other hand, when the number of hits is greater than the maximum count Dmax (NO in step S403), the hit list is divided into N pages each including Dmax or less items, where N is an integer greater than 1 (step S409). In the case of Dmax=9 and 90 hits found, the hit list is divided into 10 pages. Then, a first page (1/N) is read out as a hit list page (S410) and then the steps S405–S407 are performed as described above. If one of the numeral keys [1]–[9] of the ten-key pad is selected as a direct key in the step S407, the processor 14 reads the detailed data of the record corresponding to the selected index number and displays the detailed data on the display 11 (step S408).

If a symbol key "*" or "#" of the ten-key pad is selected in the step S407, the processor 14 calls a page scroll routine (step S410). Here, when the symbol key "*" is pushed, the next page is read out as a hit list page and, when the symbol key "#" is pushed, the previous page is read out as a hit list page. In other words, each time one of the symbol keys "*" and "#" of the ten-key pad is selected in the step S407, the page scroll is performed. When a hit list page is read out in this way, the steps S405–S408 are performed as described above.

Figure 5A:
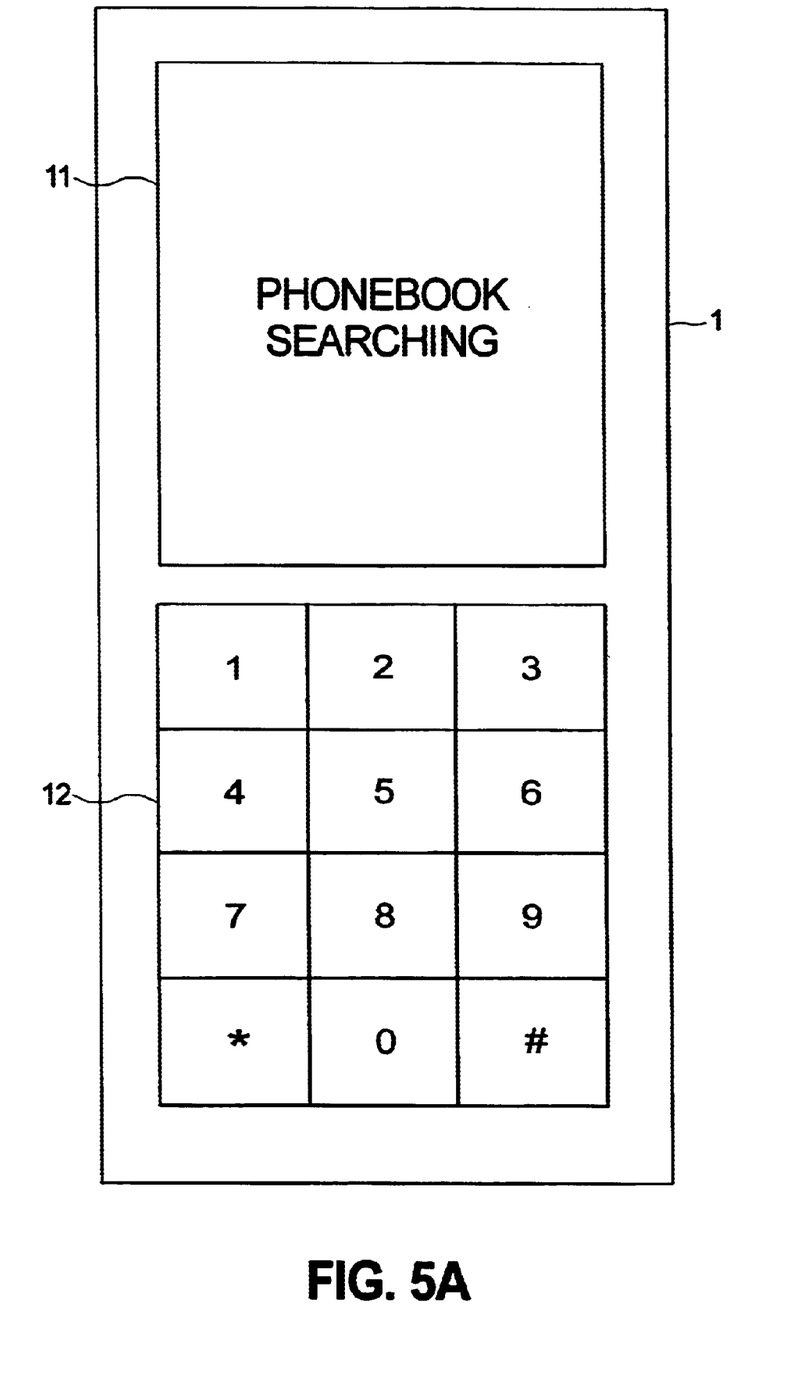
FIG. 5A is a plan view of the radio mobile telephone when searching a phonebook.
Figure 5B:
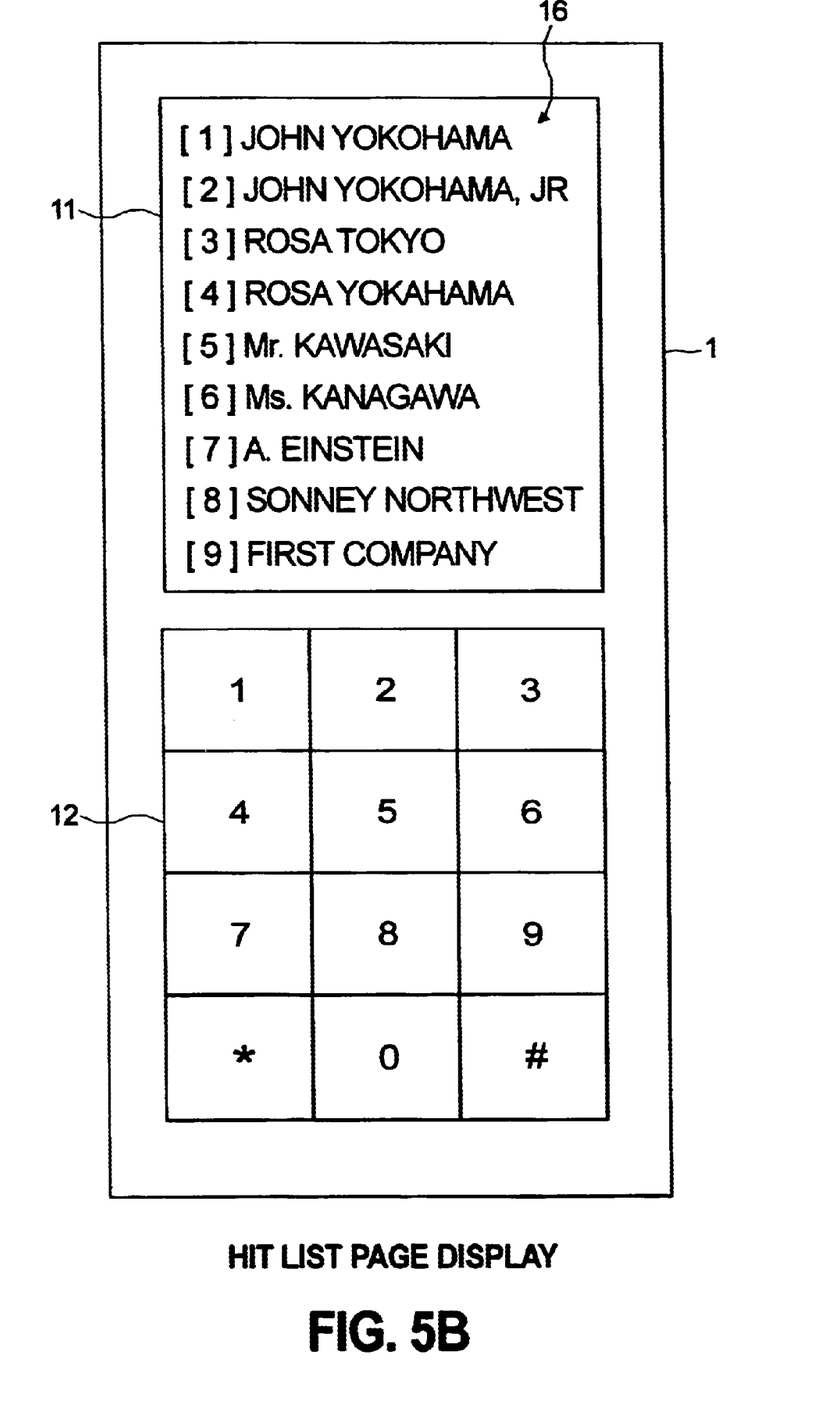
FIG. 5B is a plan view of the radio mobile telephone when a hit list page is displayed on screen.

As shown in FIG. 5A, the phonebook search is performed by using the first name as a key word. Then, a hit list is created and indexed as described above. The indexed hit list is displayed on the display 11 as shown in FIG. 5B. For example, the name "John Yokohaman" is accompanied by index number "1", the name "John Yokohama, Jr" is accompanied by index number "2", and so on. In the case of 10 or more hits, the symbol key "*" or "#" of the ten-key pad is used to scroll by page, as described before.

Figure 5C:
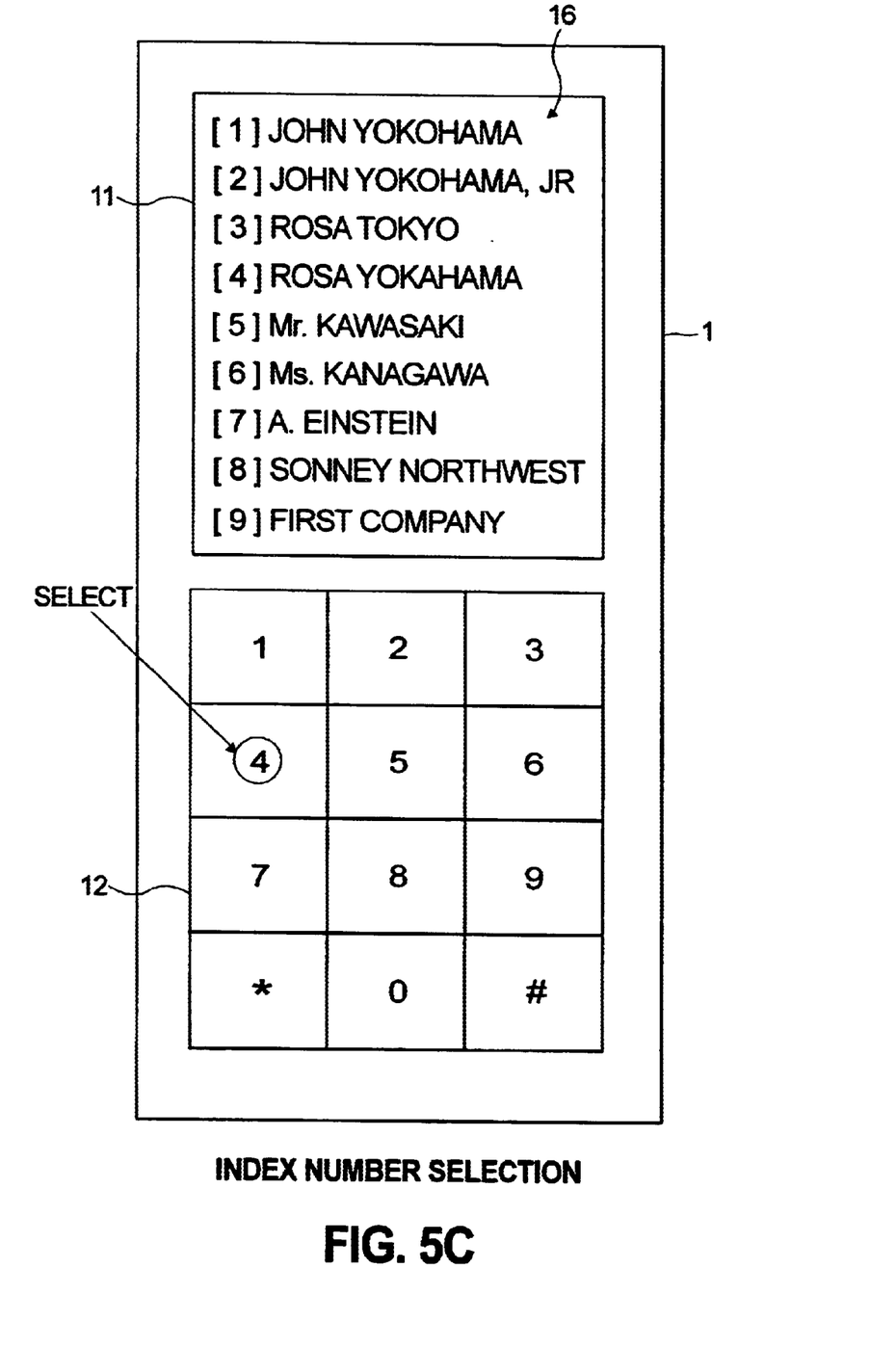
FIG. 5C is a plan view of the radio mobile telephone when one of the index numbers is selected.
Figure 5D:
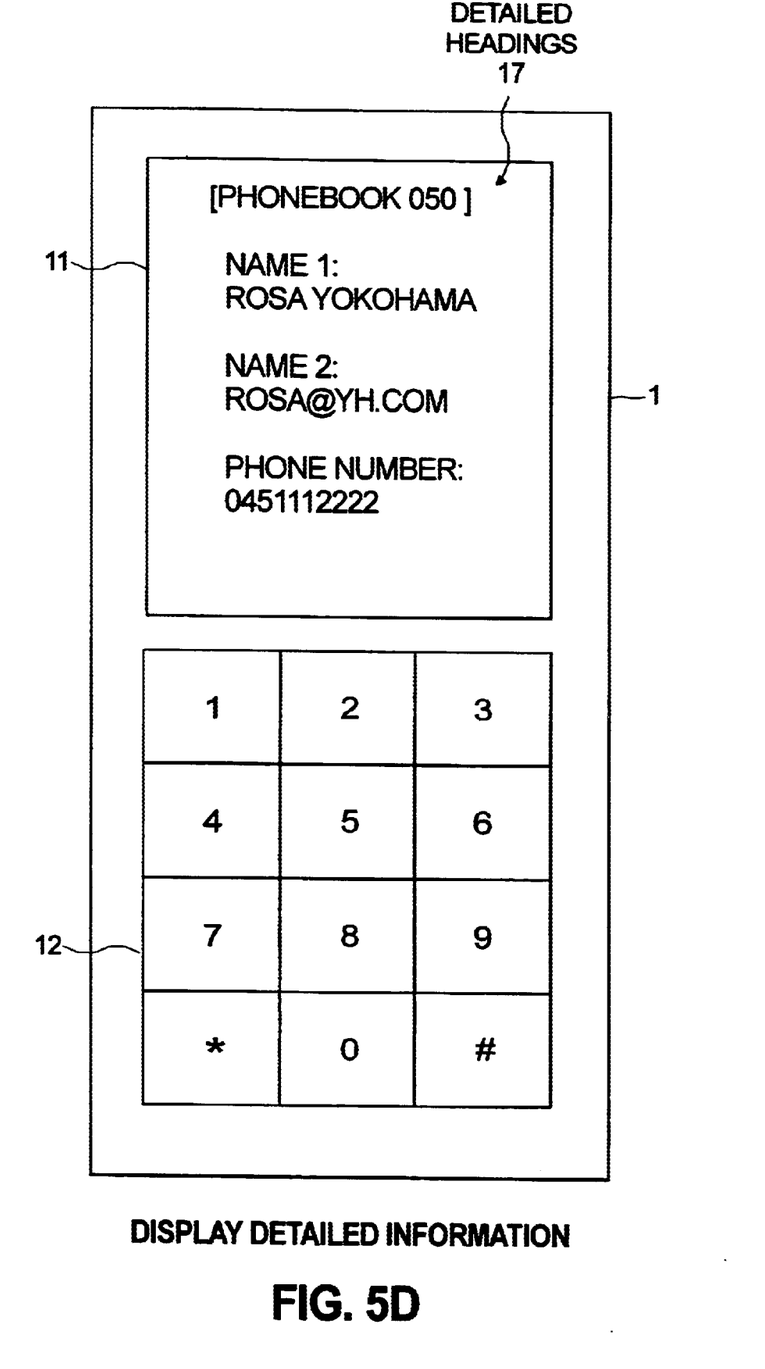
FIG. 5D is a plan view of the radio mobile telephone when the detailed information for the selected index number is displayed.

In the case where the user needs more detailed information about "Rosa Yokohama" accompanied by the index number "4", the user pushes the key labeled "4" of the ten-key pad as shown in FIG. 5C. In other words, the key labeled "4" labeled the same numeral as the index number is selected. When the key labeled "4" of the ten-key pad is pushed, the detailed data, or detailed headings 17, that is, the second name and the phone number of "Rosa Yokohama" corresponding to the selected index number "4" are further displayed as shown in FIG. 5D.

In this manner, since the displayed list is indexed on the display 11, the user can easily obtain detailed information by directly selecting an index number corresponding to target information through the ten-key pad. Therefore, even if the mobile telephone becomes more intelligent and multifunctional, the user can easily operate such a mobile telephone, so that mistakes are avoided and the time required for necessary operation is reduced.

The present invention is also applicable to another selection operation, for example, a function selection operation such that a desired function is selected from many function items displayed on the display of a mobile telephone. The detail will be described hereafter with reference to FIG. 6.

Figure 6:
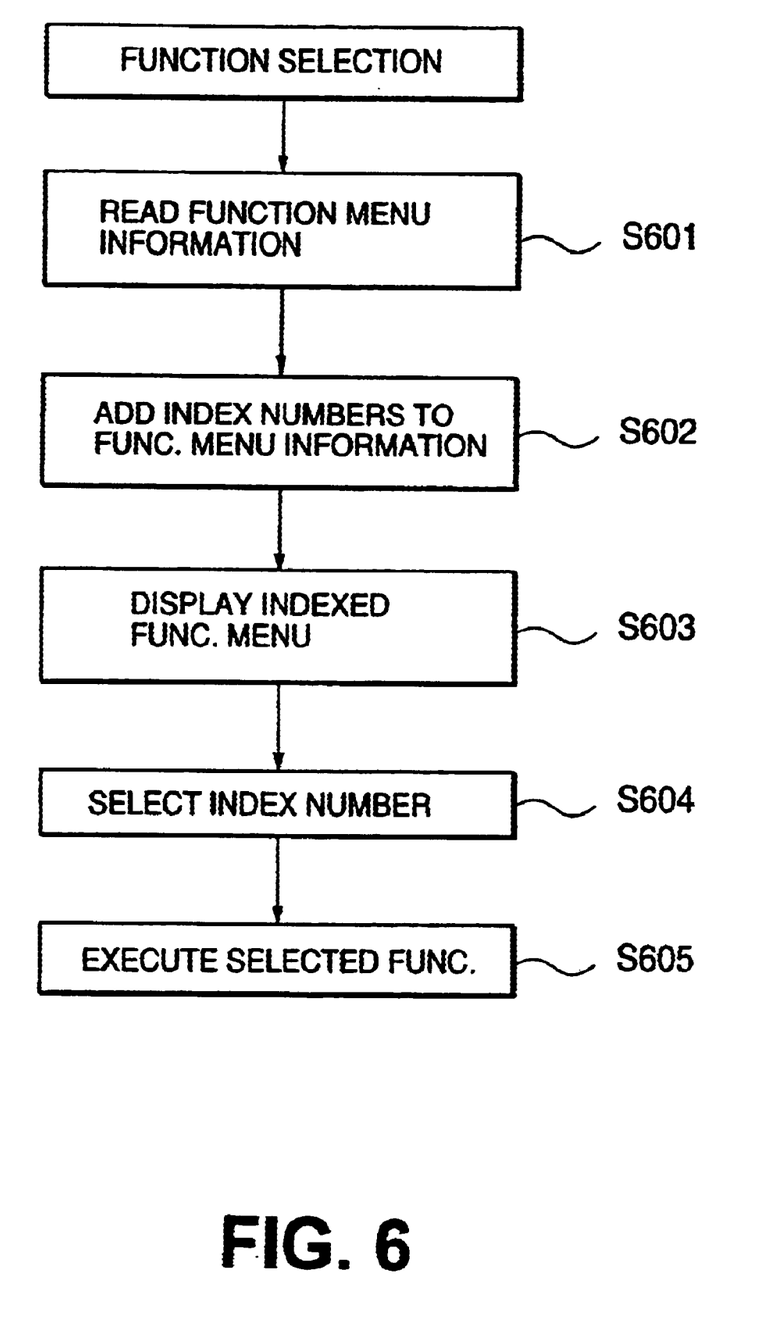
FIG. 6 is a flowchart showing an index management operation according to another embodiment of the present invention.

Referring to FIG. 6, in a function selection mode, function menu information is read from the memory (step S601) and then is indexed to create a function menu management list (step S602). The indexed function menu is displayed on the display such that a different index number is added to each function item of the function menu (step S603). In the case of the display screen displayable to a maximum of nine lines, an index number ranges from 1 to 9. When one numerical key of the ten-key pad corresponding to the index number of a desired function is selected by the user pushing that numerical key (step S604), the selected function is executed (step S605).

In this manner, even in the case of the multifunctional and intelligent mobile telephone requiring complicated function operations, the index management method according to the present invention allows easy operation.

What is claimed is:

1. A method for managing information in a portable communication apparatus including a memory, an input device including a ten-key pad, and a display, the method comprising the steps of:

selecting data from a set of data according to a desired condition inputted through the input device;

determining whether a number of pieces of selected data is not greater than a maximum number of alphanumeric character lines displayable on the display; when the number of pieces of selected data is greater than the maximum number of alphanumeric character lines displayable on the display, dividing the selected data into a plurality of pages each containing a number of pieces of selected data which is not greater than the maximum number of alphanumeric character lines displayable on the display;

sequentially selecting a page from the plurality of pages through the input device;

adding a sequential index number to each piece of selected data in a selected page;

displaying each piece of the selected data accompanied with a sequential index number in the selected page on the display; and selecting a desired piece of selected data by operating a numeral key of the ten-key pad corresponding to a sequential index number accompanying the desired piece of selected data through the input device.

* * * * *